(12) United States Patent
Benton et al.

(10) Patent No.: US 10,019,460 B2
(45) Date of Patent: Jul. 10, 2018

(54) HOSTED FILE SYNC WITH DIRECT ACCESS TO HOSTED FILES

(71) Applicant: Microsoft Technology Licensing, LLC, Redmond, WA (US)

(72) Inventors: James Benton, Hanover, NH (US); Spencer Bishop, Kirkland, WA (US); Jason Shay, Seattle, WA (US); Michael Murstein, Bellevue, WA (US); Ran Kalach, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 328 days.

(21) Appl. No.: 14/853,746

(22) Filed: Sep. 14, 2015

(65) Prior Publication Data

US 2017/0075921 A1    Mar. 16, 2017

(51) Int. Cl.
*G06F 17/00* (2006.01)
*G06F 17/30* (2006.01)
*H04L 29/08* (2006.01)

(52) U.S. Cl.
CPC ........ *G06F 17/30174* (2013.01); *H04L 67/02* (2013.01); *H04L 67/06* (2013.01); *H04L 67/1095* (2013.01)

(58) Field of Classification Search
CPC ... G06F 17/30174; H04L 67/02; H04L 67/06; H04L 67/1095
USPC ........................................................ 707/610
See application file for complete search history.

(56) References Cited

U.S. PATENT DOCUMENTS

| | | | | |
|---|---|---|---|---|
| 7,483,923 | B2* | 1/2009 | Novik | G06F 17/30174 |
| 8,166,101 | B2* | 4/2012 | Shah | G06F 17/30595 |
| | | | | 709/203 |
| 9,805,051 | B2* | 10/2017 | Bergner | G06F 17/30174 |
| 2005/0044530 | A1* | 2/2005 | Novik | G06F 17/30174 |
| | | | | 717/122 |
| 2009/0193107 | A1* | 7/2009 | Srinivasan | G06F 17/30132 |
| | | | | 709/223 |

(Continued)

OTHER PUBLICATIONS

Ribeiro, João et al., "MultiRep—Asynchronous Multi-Device Consistency", M-MPAC 2011, Lisbon, Portugal, Dec. 12, 2011, 10 pages.*

(Continued)

*Primary Examiner* — Robert Stevens
(74) *Attorney, Agent, or Firm* — Buckley, Maschoff & Talwalkar LLC (57) ABSTRACT

Disclosed herein is a system and method that can be used to synchronize files from a hosted file system where the client endpoint devices have direct access to the files stored on a hosted file store/system. When the client synchronizes with the files stored on the hosted file store the synchronization process identifies the files that need to be synchronized with the client and prepares batches of files to be synced. During the process of synchronization the files are not locked from other user's being able to use the files. If the file is modified by another endpoint during the file synchronization process the file will not be synchronized with the client device during the particular synchronization process. In this way synchronization becomes possible with the hosted service without impacting the performance of other devices that use and access the data in the hosted file store.

20 Claims, 6 Drawing Sheets

(56) References Cited

U.S. PATENT DOCUMENTS

| | | | |
|---|---|---|---|
| 2011/0276538 A1 | 11/2011 | Knapp | |
| 2012/0137199 A1 | 5/2012 | Liu | |
| 2013/0226876 A1 | 8/2013 | Gati | |
| 2013/0346849 A1* | 12/2013 | Krueger | G06F 17/3089 715/234 |
| 2014/0040286 A1 | 2/2014 | Bane | |
| 2014/0108617 A1 | 4/2014 | Gerstner | |
| 2014/0281526 A1* | 9/2014 | Lindteigen | H04L 63/0442 713/168 |
| 2015/0095972 A1 | 4/2015 | Sharma | |
| 2016/0065675 A1* | 3/2016 | Brand | G06F 17/30174 709/213 |
| 2017/0124111 A1* | 5/2017 | Sharma | G06F 17/30174 |

OTHER PUBLICATIONS

Hwang, Myung Jin, et al., "Enhancing the Performance of Metadata Service for Cloud Computing", WI-IAT 2010, IEEE Computer Society, © 2010 IEEE, pp. 402-405.*

Calder, Brad, et al., "Windows Azure Storage: A Highly Available Cloud Storage Service with Strong Consistency", SOSP '11, Cascais, Portugal, Oct. 23-26, 2011, pp. 143-157.*

Dewan, Hrishikesh, et al., "A Survey of Cloud Storage Facilities", Services 2011, Washington, DC, Jul. 4-9, 2011, pp. 224-231.*

Drago, Idilio, et al., "Inside Dropbox: Understanding Personal Cloud Storage Services", IMC '12, Boston, MA, Nov. 14-16, 2012, pp. 481-494.*

Zhang, Yupu, et al., "ViewBox: Integrating Local File Systems with Cloud Storage Services", FAST '14, Santa Clara, CA, Feb. 17-20, 2014, pp. 119-132.*

* cited by examiner

HOSTED FILE SYNC WITH DIRECT ACCESS TO HOSTED FILES

BACKGROUND

Various file sync solutions have been generated through the years. In these solutions the sync end-points are accessible to users and applications. When files are being created, modified or deleted, an active-active sync engine is responsible for syncing these changes and bringing all end-points to a consistent state. Some sync solutions support having a hosted file endpoint. However, these solutions suffer from one or both of the following limitations. First the hosted end-point is not accessible to end-users or applications. Instead, the hosted end-point serves only as a 'hub' to sync files between other (non-cloud) end points. Second the hosted end point may be accessible, but is accessible only via a sync solution specific access protocol. In essence, there is no 'direct access' to files at the hosted end point. Instead, the application or service must implement the sync solution specific protocol and access the files through the sync solution as an intermediate layer.

SUMMARY

The following presents a simplified summary of the disclosure in order to provide a basic understanding to the reader. This summary is not an extensive overview of the disclosure. Its sole purpose is to present some concepts disclosed herein in a simplified form as a prelude to the more detailed description that is presented later.

The present disclosure presents a system and method that can be used to synchronize files from a hosted file system where the client endpoint devices have direct access to the files stored on a hosted file store/system. When the client synchronizes with the files stored on the hosted file store the synchronization process identifies the files that need to be synchronized with the client and prepares batches of files to be synced. During the process of synchronization the files are not locked from other users being able to use the files. If the file is modified by another endpoint during the file synchronization process the file will not be synchronized with the client device during the particular synchronization process. In this way synchronization becomes possible with the hosted service without impacting the performance of other devices that use and access the data in the hosted file store.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. This is distinct from computer storage media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media, but not within computer storage media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Figure 1:
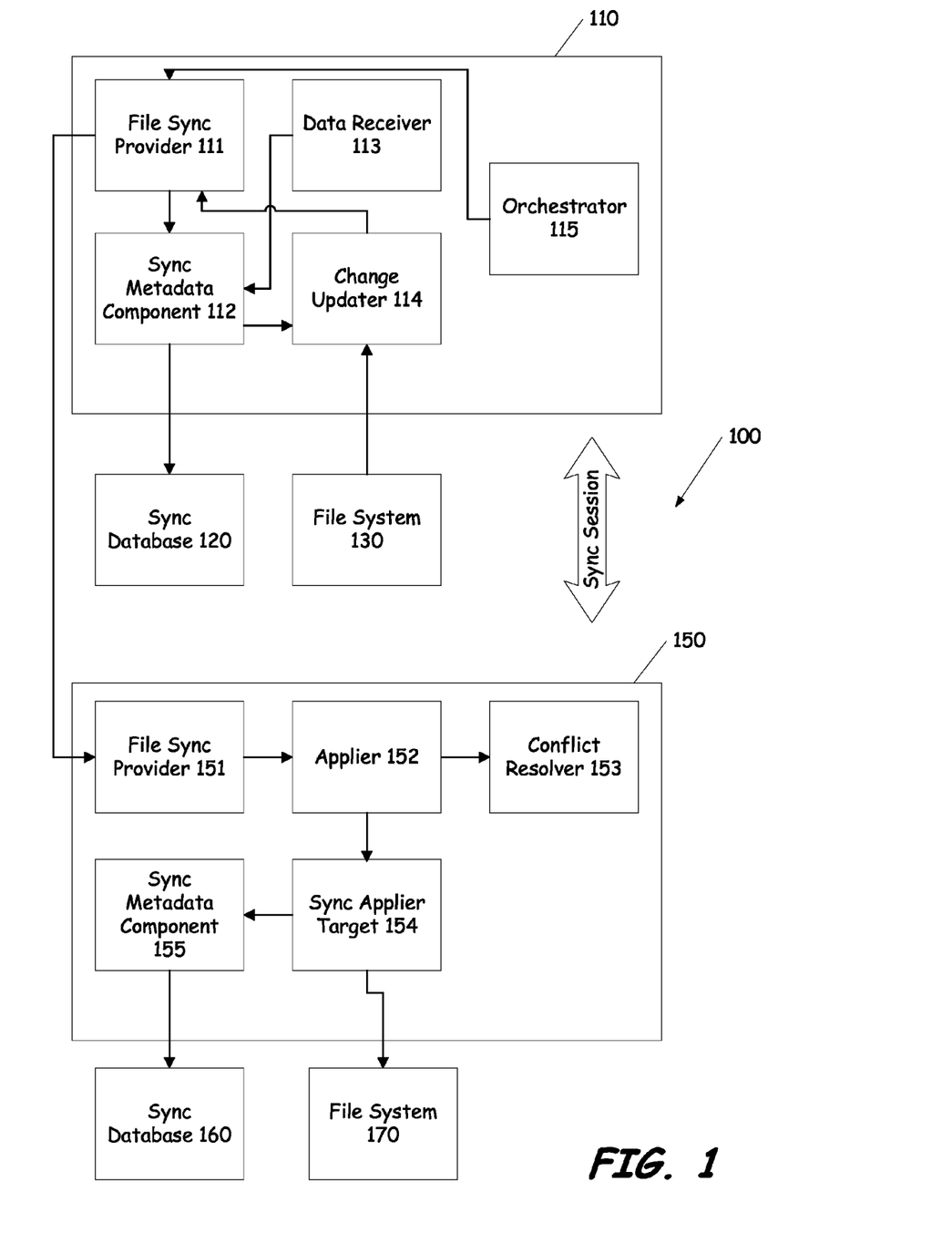
FIG. 1 is a high level block diagram illustrating components of a file synchronization system according to one illustrative embodiment.

FIG. 1 is a high level block diagram illustrating components of a file synchronization system 100. The file synchronization system 100 includes a sync endpoint 110 and a sync endpoint 150. The sync endpoint 110 is connected with a sync database 120 and is associated with a file system 130. Likewise the sync endpoint 150 is connected with a sync database 160 and is associated with a file system 170. The sync endpoint 110 includes a file sync provider 111, a sync metadata component 112, a data receiver 113, a change updater 114 and an orchestrator 115. Sync endpoint 150 includes a file sync provider 151, an applier component 152, a conflict resolver/detector 153, a sync applier target 154, and a sync metadata component 155. For purposes of this discussion the components are arranged in an upload scenario from endpoint 110 to endpoint 150.

Before discussing the specific components of a provider 111 or 151, the different types of participants that can provide data will be discussed. A participant is a location where information from a data source is retrieved. A participant could be anything from a web service, to a laptop, to a USB thumb drive.

Based on the capabilities of the particular device, the way that a provider integrates synchronization will vary. At the very least, the device is capable of programmatically returning information when requested. Ultimately, what needs to be determined is if the device can enable information to be stored and manipulated either on the existing device or within the current data store, and allow applications to be executed directly from the device.

It is important to distinguish the types of participants to know if the participant will be able to store any state information required by the provider, and if it is possible to execute the provider directly from the device. Ideally, the participant model is generic. As such, a full participant could be configured to be either a partial or simple participant.

Full participants are devices that allow developers to create applications and new data stores directly on the device. A laptop or a Smartphone are examples of full participants because new applications can be executed directly from the device and new data stores can be created to persist information if required. Partial participants are devices that have the ability to store data either in the existing data store or another data store on the device. These devices, however, do not have the ability to launch executables directly from the device. Some examples of these participants are thumb drives or SD Cards. These devices act like a hard drive where information can be created, updated or deleted. However, they do not typically give an interface that allows applications to be executed on them directly. Simple participants are devices that are only capable of providing information when requested. These devices cannot store or manipulate new data and are unable to support the creation of new applications. RSS Feeds and web services provided by an external organization such as Amazon or EBay are both examples of simple participants. These organizations may give the ability to execute web services and get results back, however, they do not give the ability to create data stores for a particular user, and they also do not give the ability to create applications to be executed within their web servers.

The file sync provider 111 and provider 151 are similar components found both on the sync endpoint 110 and the sync endpoint 150. The file sync provider can be used to synchronize files and folders in many different file systems such as NTFS, FAT, or SMB file systems. Further, the directories to synchronize can be local or remote. They do not have to be of the same file system. An application can use static filters to exclude or include files either by listing them explicitly or by using wildcard characters (such as *.txt). Or the application can set filters that exclude whole subfolders. An application can also register to receive notification of file synchronization progress.

The orchestrator 115 is a component of the system 100 that is configured to initiate and control a sync session between two endpoints or participants. The orchestrator communicates with both providers 111 and 151 to start the synchronization process and reports back to the progress of the synchronization. The actual processes used by the orchestrator are well known in the synchronization process and any process can be used by the orchestrator 115.

The change updater 114 is a component of the system 100 that determines what files in the file system 130 have been changed since the last time the sync endpoint synced with the replicas. The detection of a change can be made by simply comparing the timestamps associated with a corresponding last sync time. Other approaches and methods can be used for determining changes that have been made in a namespace.

The sync databases 120 and 160 are a component of the system 100 that stores metadata about the files in the file system. The sync databases 120 and 160 provide metadata about particular files that are to be synced between the client and the server. These databases may also be referred to as a metadata store.

The sync database 120 provides the ability to store information about the file system and the objects within that file system with respect to state and change information. The metadata for a file system can be broken down into five components (concurrency tracking properties): versions, knowledge, tick count, replica ID and tombstones.

For each item that is being synchronized, a small amount of information is stored that describes where and when the item was changed. This metadata is composed of two versions: a creation version and an update version. A version is composed of two components: a tick count assigned by the data store and the replica ID for the data store. As items are updated, the tick count is incremented by the data store and the new current tick count is applied to that item. The replica ID is a unique value that identifies a particular data store. The creation version is the same as the update version when the item is created. Subsequent updates to the item modify the update version. That is the creation version remains constant while the update version changes.

There are two primary ways that versioning can be implemented. The first is referred to as inline tracking. In this method change tracking information for an item is updated as the change is made. In the case of a database, for example, a trigger may be used to update a change tracking table immediately after a row is updated. The second method is referred to as asynchronous tracking. In this method, there is an external process that runs and scans for changes. Any updates found are added to the version information. This process may be part of a scheduled process or it may be executed prior to synchronization. This process is typically used when there are no internal mechanisms to automatically update version information when items are updated (for example, when there is no way to inject logic in the update pipeline). A common way to check for changes is to store the state of an item and compare that it to its current state. For example, it might check to see if the last-write-time or file size had changed since the last update. Of course other methods for versioning can be used as well.

All change-tracking must occur at least at the level of items. In other words, every item must have an independent version. In the case of file synchronization an item will likely be the file. More granular tracking may be desirable in some scenarios as it reduces the potential for data conflicts (two users updating the same item on different replicas). The downside is that it increases the amount of change-tracking information stored.

Another concept is the notion of knowledge. Knowledge is a compact representation of changes that the replica is aware of. As version information is updated so does the knowledge for the data store. Providers such as providers 111 and 151 use replica knowledge to enumerate changes (determine which changes another replica is not aware of), and to detect conflicts (determine which operations were made without knowledge of each other)

Each replica should also maintain tombstone information for each of the items that are deleted. This is important because when synchronization is executed, if the item is no longer there, the provider will have no way of telling that this item has been deleted and therefore cannot propagate the change to other providers. A tombstone can contain the following information a Global ID, a update version and a creation version. Because the number of tombstones will grow over time, some implementations may create a process to clean up this store after a period of time in order to save space. That is these deleted files are removed from the list of files that are maintained with metadata information. However, it is possible that one of these files could reappear at a later time if a device that hadn't synced in a while attempts to sync and has references to that deleted file. The system would add the file back into the files as the file would appear to be a new file. In order to prevent this from happening the system can implement a method for catching these files. The method starts out by first identifying if the condition has been met, where there is a possibility of a lost tombstone. The replicas maintain another copy of knowledge, which can be considered or referred to as 'Forgotten Knowledge'. When tombstones are removed/cleaned up from a database, the forgotten knowledge is set/updated. This forgotten knowledge may keep track of what tick counts have been cleaned up through. This can provide a hint as to when tombstones may have been lost. Then, if sync does not happen for a while (a replica becomes stale), the forgotten knowledge helps detect that a replica may be stale. Stale replicas can then initiate a 'full enumeration sync session'. This full enumeration is a time intensive and expensive sync session whereby all files are synced between the participants of the sync session.

The applier 152 is a component of the system that applies the specific changes that are indicated as being needed to complete the sync process. These changes are the changes that were noted by the change updater 114 in the sync process based on the metadata that is associated with each of the files. Depending on the direction of the sync process (upload or download) the applier 152 will operate on the corresponding sync endpoint. In FIG. 1 the illustration is of the uploading process where client 120 is uploading its changes to the client 150.

Conflict detector 153 detects conflicts between a data file that has already been stored and a purported updated version of the data file that is received as part of the syncing process. Fundamentally, a conflict occurs if a change is made to the same item on two replicas between synchronization sessions. Conflicts specifically occur when the source knowledge does not contain the destination version for an item (it is understood that the destination knowledge does not contain any of the source versions sent). If the version is contained in the destination's knowledge then the change is considered obsolete. Replicas are free to implement a variety of policies for the resolution of items in conflict across the synchronization community. In some approaches each of the replicas makes the same resolution regardless of where the conflict occurred or where it was detected.

The following are some examples of commonly used resolution policies: Source Wins: Changes made by the local replica always win in the event of a conflict. Destination wins, the remote replica always wins. Specified replica ID always wins, that is no matter who changes an item, the replica with the designated ID always wins. Last-writer wins, this is based on the assumption that all replicas are trusted to make changes, and that wall clocks are synchronized. Therefore, the last writer to the file is allowed to win. Merge, in the event of two duplicate items in conflict, the system merges the information from one file into the other. Log conflict:, in this approach the system chooses to simply log or defer the conflict.

The sync target applier 154 is a component of the system that applies the indicated changes following the resolution of any conflicts as determined by the conflict resolver. The specific changes are split into two groups. The first group is the actual data that was changed to the file. This information is processed through the applier 152 and provided to the file system 170 which causes the appropriate change to be made to the underlying file. The second set of changes are those changes that are made to the sync metadata. These are applied to the sync database 160 through the metadata component 155 where the metadata about the particular files are stored.

Figure 2:
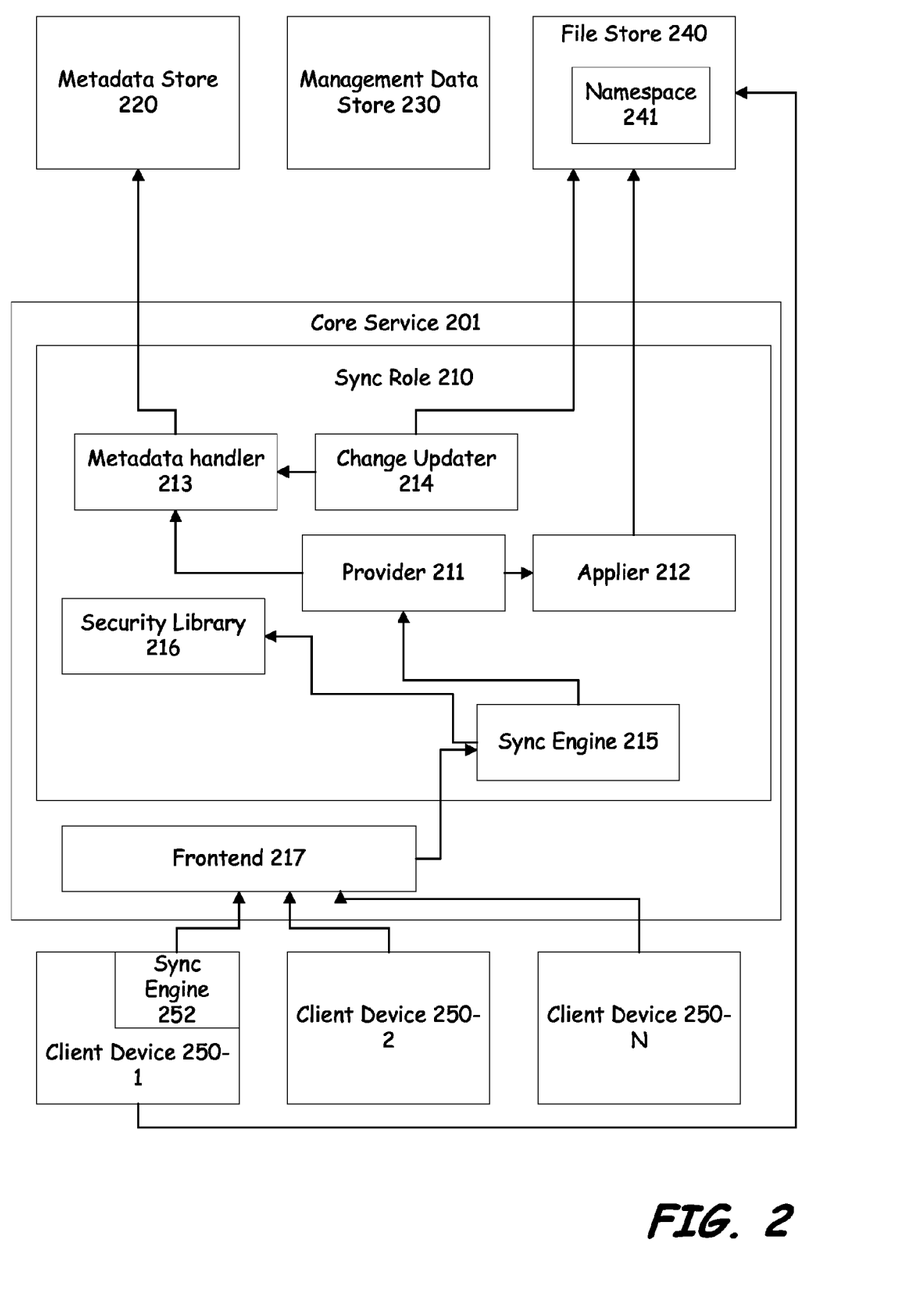
FIG. 2 is block diagram of a file synchronization system where the client devices have direct access to a hosted file store according to one illustrative embodiment.

FIG. 2 is a block diagram of a system 200 having a sync role 210 implementing the sync approach presented herein where client devices 250 have direct access to the file store 240 without the need to go through the sync role 210 to access the files. System 200 includes a sync role 210, a metadata store 220, a management data store 230, a file store 240, and client devices 250.

The sync role 210 is a service that is hosted on a remote platform from the client devices 250, for example, a cloud service. Sync role 210 is similar to the sync endpoints 120 and 150 discussed above with respect to FIG. 1. As such the sync role 210 includes a file sync provider 211, a file applier 212, a metadata handler 213, and a change updater 214. These components function similar to their corresponding components in FIG. 1 and may not be discussed in further detail. Sync role 210 also includes sync engine 215, a security library 216 and a frontend 217.

File access activity, in particular file/folder updates, can occur at any time. In order for the local changes to be visible to the sync partners, the change first needs to be detected and resolved into the sync database. The present approach implements change detection by employing periodic enumeration, with an optimization as well as other mechanisms. However other methods of change detection can be used.

Change detection is accomplished by the change updater component 214. Change updater component 214 implements a background task that periodically reads a subset of the per-item metadata for each item in the sync namespace 241 of the file store 240, and compares the metadata to what is stored in the metadata store 220. The subset of metadata is the same set of properties mentioned earlier as concurrency tracking properties. The concurrency tracking properties can include, versions, knowledge, tick count, replica ID, tombstone, timestamp, ETAG, and/or any other property that can be tracked that can provide a reliable indicator of a change. This is the set of properties that, if not changed, provide a reliable indication that the file itself has not changed. When change updater component 214 detects a change in any of the concurrency tracking properties, it will then read all of the metadata properties for the item from the cloud file system and update the sync metadata store 220. In this way the local changes would then be visible to subsequent sync sessions. These local changes are the changes that were made by endpoints (devices) that can directly access the namespace 241 to read and write data to the namespace 241 in the file store 240.

Because the namespace 241 can be quite large, and a full enumeration of the namespace can be quite expensive in terms of both time and resources, the change updater component 214 can implement an optimization process. At each folder level in the namespace 241, the concurrency tracking properties for all the children of the folder are hashed to generate a new per-item property stored in the metadata store 220 for the folder item. This hash is initially performed during the first full enumeration of the folder. Incremental enumerations can then recompute the hash by reading only the concurrency tracking properties of each of the current items in the folder and comparing to the folder hash value. When the hashes match, the directory can be skipped. Some implementations hash only a single timestamp property as long as the timestamp gives a reliable indication that the file has been modified. Other implementations may only hash less than all of the concurrency properties. This saves having to read all of the properties for each item in the folder at the cost of one round-trip per child item to get the current timestamp value. Further optimization comes with the ability to retrieve timestamps values from the file store 240 in batches In embodiments where the file system includes a feature that provides a top-level or container level indication that a change in the namespace 241 has occurred, then a throttling of extraneous periodic enumerations is possible. That is the periodic enumerations can be reduced or better targeted by the system 200 so as not to update when it is not necessary. In the present system, when the namespace 241 is being explicitly changed by the sync process itself, it becomes necessary to ensure that the change does not result in an expensive re-enumeration of the namespace. As such the present system provides a means for masking the changes caused by the sync role 210 from causing the container level indicator to signal that the change has been made. This can be done, for example, by modifying the sync process to finish by changing the container indication from modified to unmodified. Other approaches can be used as well.

When the file system supports CIFS/SMB, as is the case for Azure Files and other systems, directory change notifications can be used to recursively monitor for changes in a namespace. This approach does not support a way to filter the sync role 210 operations made during a sync. However, the directory notifications are in one approach systematically ignored during the change applier phase of a sync upload session. This increases the risk of missing a local change that occurs simultaneous to the change applier procedure. Depending on the application, missing a local change (for some time until a full enumeration occurs) may or may not be acceptable.

The sync engine 215 is a component of the system 200 that receives a request from an endpoint, such as a client device 250 to sync with the file store 240. The sync engine 215 manages the entire synchronization process between the sync role 210 and the endpoint. The sync engine 215 will communicate with a corresponding sync engine 252 operating on the devices 250. In this way the request for the sync process to begin with will be initiated on the client device 250 through its sync engine 252. Sync engine 252 will pass the request to the sync engine 215 on the sync role 210. The security library is a component of the sync role 210 that applies any necessary security controls on the access to the data through the sync role 210. For example, during a sync process the device 250 that is attempting to sync data can first be validated for having the permissions to access the underlying data and therefore, be permitted to sync. This authentication can be done using any authentication process. If the user is not authorized to perform the particular action the sync engine 215 will not process the request further and will return a message indicating that the sync process cannot be completed. In some instances the security service will indicate that a portion of the data can be synced. The sync engine will then process the sync request only on the data that the client is authorized to access. In some approaches the security library may also be used to ensure that only authorized client devices 250 are able to have direct access to the file store. In this approach the security library provides, for example, an access token to the client device that the client device presents when directly accessing the file store.

The frontend 217 is a component of the core service 201 that handles all requests from endpoints for sync processes. Based on the type of request that is received the frontend 217 will assign the request to a particular workflow through the synchronization process. Typically, the requests will either be long running tasks or short running tasks. Short running tasks in a sync process include for example requests for knowledge related to what files have changed. The frontend 217 passes these requests through to the sync engine 215 with knowledge that this request will be handled as soon as the request is passed through. Long running tasks in a sync process for example include for example batch generation and preparing and committing of the batches. The frontend 217 passes these requests through the sync engine 215 with the knowledge that the tasks will be queued up for processing and that client requests for the status/results of the tasks will be expected. The frontend 217 also handles and processes requests from client devices to access the data contained within the file store 240. These requests allow for devices that do not have direct access to the file store to access the data.

Metadata store 220 is a component of system 200 that handles the metadata for both the syncing process and files themselves. The metadata store 220 implements replica and item metadata storage, secondary indexes, locking, snapshot isolation and garbage collection. The secondary indexes support query patterns for a variety of sync scenarios, such as range queries. Locking is provided to ensure that a single writer at a time can access a particular file or a particular replica where the file resides. These accesses occur when processing change batches or during enumeration of a particular namespace. Snapshot isolation consumes committed data and prevents garbage collection until the various endpoints have consumed the data that has been committed. The snapshot isolation can allow for parallel operations such as operations that do not write to namespace, but simply read from it. The metadata store also provides cross-table consistency. Knowledge and item data must be committed together. This ensures that the full picture for a particular replica is known. That is has the replica changed or not and what the state of the replica is.

The management data store 230 is a component of the system 200 that manages the placement of the data within the file store 240 and corresponding namespace 241. As the file store 240 is shared among a variety of different users and customers each namespace must be kept separate for other namespaces. The management data store 230 maintains a table for each namespace 241-1, 241-2, 241-N (collectively 241) that is managed by the hosting system. Each table represents the configuration for the particular tenant's replicas and the namespace for each replica stored in the file store. This configuration ensures that the sync represents the correct configuration of the file store 240 and that the metadata also reflects this configuration.

The file store 240 is a component of the system 200 where the actual data for the namespace 241 resides. The file store 240 can store the data in containers. Each user has a corresponding container in the file store 240 that corresponds to the sync folder maintained in the management data store 230. These user containers may be shared with a number of different users and devices as well. Access to the container may occur from multiple endpoints at the same or nearly the same time. A single container is maintained for the generic share. Again the generic share corresponds to the sync folder on the management data store. Unlike traditional file stores in a hosted environment the users and devices can write directly to the corresponding containers without having to go through the sync role 210 to perform these reads and writes. The various endpoints (users and devices) are provided with information that allows them to know the actual location on the file store 240 where the data resides, such as a uniform resource identifier (URI) or uniform naming convention (UNC). Previous approaches have required the use of the intermediary to access the file store as the location of the file store to the device was not known precisely. However, access to the file store 240 for a particular container or namespace can still be done through the sync role 210 as traditionally done. Thus, depending on the capabilities of the application or device the file may be accessed through either method. As such, legacy applications are able to use the file store 240 without modification. The data that is stored in the file store 240 and the particular containers is stored in a stateless manner. That is the client manages any transient state necessary for any client interactions with the file store. The file store 240 does not maintain any of this information with respect to this transient state of the data in its own system.

Before a file namespace 241 can be synchronized to the cloud endpoint, storage must be allocated or provisioned for the files, directories and metadata. The present approach provisions a single file share or container for each sync namespace. In this way multiple namespaces can be hosted on the cloud, but each namespace is able to remain separated from one another. In one approach the file share is an Azure File Share. However, other versions and types of file shares can be used.

A file share is a unit of file storage that represents the root of a hierarchical namespace of folders and files. The share can be access through an application programing interface (API), such as the Azure File REST API, and also through protocols, such as the CIFS/SMB protocol.

By mapping a sync namespace to a file share a number of advantages can be recognized. First the file share allows for direct sync-to-share namespace root mapping. Other provisioning options such as user-to-share mapping or tenant-to-share mapping require that the individual sync namespaces are carved out underneath a file share root. Second is snapshot isolation. The present approach leverages the file share-level snapshot feature of the hosting service. This supports the ability to create and maintain an efficient copy of the state of the share at a single point in time. This is important for supporting backup-restore, migration, high-availability and other functionality where a consistent view of the namespace is desired. Third is security isolation. The present approach leverages a shared access signature (SAS) authorization feature of the host service. This supports an option of controlling access to the share at the root level on a per-namespace basis. Share level access control can be in place of or in addition to finer grained access control at the file or folder level.

The hosting system can implement two different approaches for determining when to provision the file share for the particular namespace. One approach is to use explicit provisioning through a management console to create a namespace sync partnership with a specific user's namespace. A second approach is to implicitly provision the namespace when the first attempt to sync with the names pace.

Once the sync namespace has been provisioned with a file share the namespace can be synchronized between a participant and the cloud endpoint. The sync solution uses a file synchronization protocol between two parties (endpoints) of the sync partnership. The process of synchronization can follow the process discussed above with respect to FIG. 1. However, it should be noted that the protocol involves the exchange of metadata about the state of the files/folders inside the namespace on each of the endpoints followed by one or more upload and download sessions where file and folder metadata and data are transferred and created on each endpoint until the state of the namespace on each endpoint matches. In the case where the state of files have changed on both sides of the sync partnership since the last sync session, conflicts are detected which may result in one or both sets of changes being retained.

The present approach for a given namespace leverages two forms of persistent data. The synchronization metadata store 220 and the synchronization namespace repository or file store 240, sometimes referred to as the sync replica, or replica. In order for the present system to operate effectively, these two forms of persistent data are kept in a consistent state.

The present approach uses files associated with the file system of the hosting system to store all of the per-file metadata that is targeted to keep in sync across sync endpoints. This also includes metadata that may not be supported by the hosting system's file system. Again one example of a hosting system's file system is Azure Files. However, other types of file systems can be used.

The persistent file storage cloud endpoint of the sync partnership natively maintains some set of per-file metadata. This system of the present approach uses a file system that supports the CIFS/SMB protocol. However, other protocols can be supported as well. This provides a native store for the important subset per-file properties needed to support a remotely accessible read-write file system. An example set of per-file native SMB properties used for cloud file storage is: file name; file size; file Id (a unique identifier for the file that remains consistent for the lifetime of the file even across moves and renames); creation time; last write time (last time the file data changed); last change time (last time the file changed in any way including metadata changes or internal file system changes not necessarily visible outside the file system); and file attributes (indicators of file state such as read-only, system-file, type (e.g. file versus directory)).

The system of the present approach can store the per-file metadata that is supported natively by file systems implementation of SMB/CIFS in the cloud file system itself by interfacing with the file system via the CIFS/SMB protocol. This gives the ability to mount the cloud file system as a CIFS/SMB file system and interact with the files with read-write access through any CIFS/SMB compliant client interface. This permits access to a large ecosystem of existing systems, such as, Windows, Linux, OSX, iOS, etc.

However, the file system on the other side of a given sync partnership (e.g. a sync-client to the cloud sync-server) could be any file system such as NTFS, iOS, ReFS, etc. which might maintain metadata that is not natively supported by the cloud file system. Some examples are discretionary access control lists (DACL), alternate data streams, and reparse point data. In the present system per-file metadata that is not natively supported by CIFS/SMB is also stored as per-file metadata in cloud file system. The present system can implement a REST API, such as the Azure Files REST API, to store the non-native file system properties as user-defined metadata name-value pairs. Storing non-native file metadata in this way allows for file sync between multiple sync endpoints that share a common file system that is different than the file system used in the cloud endpoint.

The per-file metadata can also include items that are not part of the native file system properties on any of the sync endpoints of a given sync topology. For instance, sync framework metadata where the sync framework itself maintains per-file metadata, for instance sync-specific globally unique identifiers, concurrency strings (etags), etc. Another example is application metadata where the sync topology could be infrastructure used by a particular higher-level application which needs to ensure that its own application-level, per-file metadata gets synced along with the file data and native metadata. This provides a benefit in that a complete set of sync metadata allows for the ability to recover/repair the sync metadata following any corruption or breakdown of the sync metadata.

The client devices 250 are any devices that can connect to the sync role 210 for the purposes of syncing their data with the data hosted and stored on the file store 240. The client devices 250 can include servers located on premise, mobile phones, laptops, tablets or any other device that interfaces with the file store 240. Further, devices can also be virtual versions of the devices where the device is hosted on another platform. The client devices 250 can interact and write to the file store 240 directly or can go through the sync role 210 to access the file store 240 and the particular containers contained therein. Each client device 250 also has its own version of the sync engine 252. This sync engine is the gateway for the client device 250 to initiate a sync upload or download with the sync role 210. From the client's perspective the sync process is no different than in systems where the only way to access data is through the intermediary.

Figure 3:
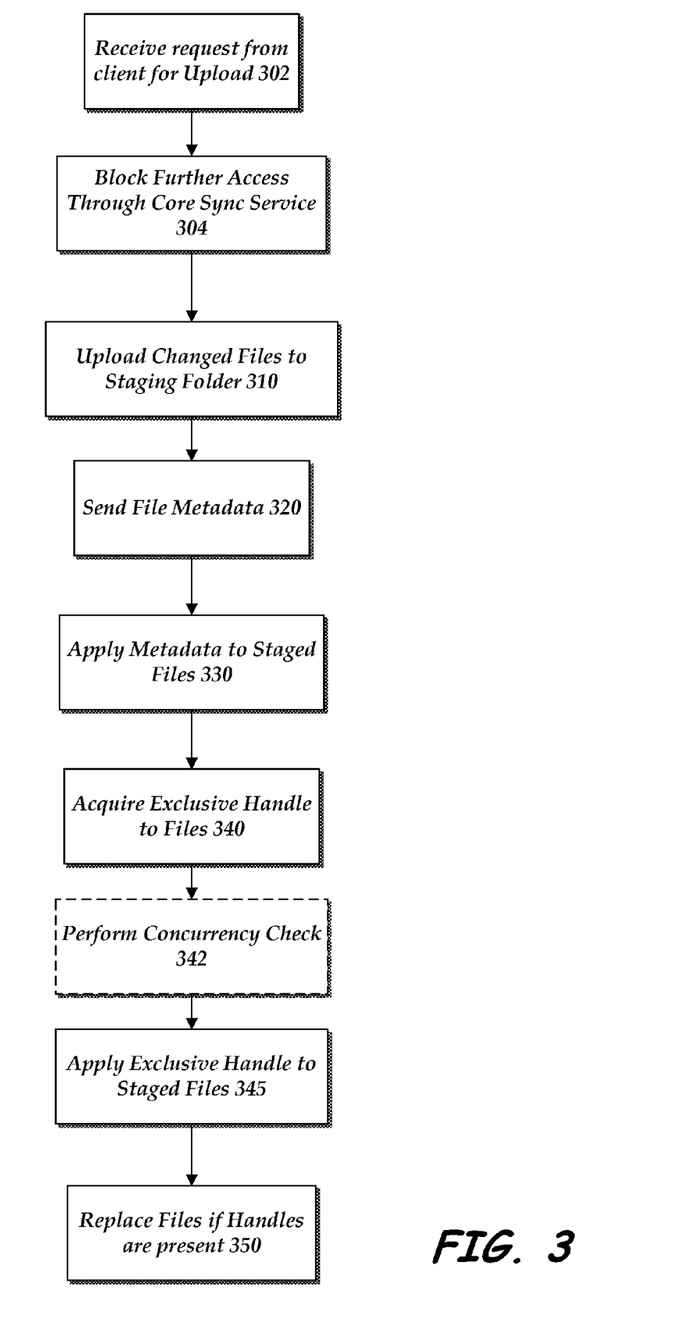
FIG. 3 is a flow diagram illustrating a process for synchronizing a client and a hosted endpoint where files are uploaded from the client device according to one illustrative embodiment.
Figure 4:
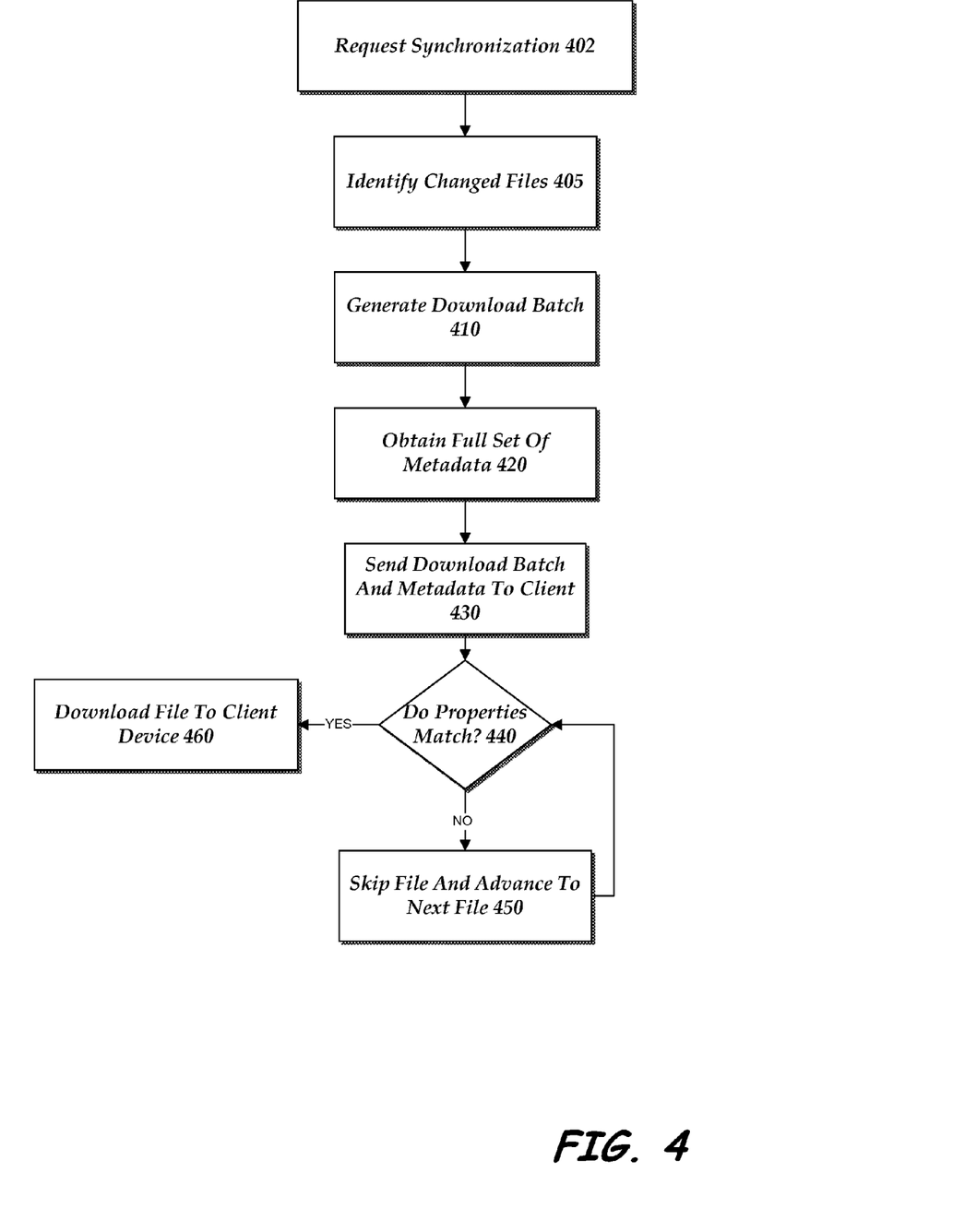
FIG. 4 is a flow diagram illustrating a process for synchronizing a client and a hosted endpoint where files are downloaded from the hosted endpoint according to one illustrative embodiment.

File sync activity in the present system can be periodic and driven by scheduled or can be on-demand directives from the client endpoints of the sync partnership. File access activity can occur at any time as the client devices 250 can directly access the file store without having to use the intermediary sync role to access the cloud based files. FIGS. 3 and 4 describe the process of syncing the files either in upload or download when the files are not fully locked during a synchronization process. The process for uploading and downloading in the synchronization process for the present system is in many ways similar to each other. Both FIGS. 3 and 4 cover a method of synchronizing files between a client device and a hosted file store through upload and download sessions. Both figures begin by receiving a synchronization request from the client device. This request can be either a periodic request or an on demand request. In response the system identifies a set of files that need to be synchronized between the client device and the file store. Depending on the direction (upload/download) the changed files will be located either on the client device or the file store. The sync engine initiates a synchronization process between the client and the file store.

FIG. 3 is a flow diagram illustrating a process for uploading sync files from an endpoint to a namespace 241 within the file store 240 where at least a portion of the endpoints (client devices) have direct access to the namespace and corresponding containers and file store.

The present system synchronizes the application of file and folder changes during an upload session with the potential for file system write activity. This process is managed by the file system applier component such as component 152 of FIG. 1 and component 212 of FIG. 2. The negotiation for which files and folders require changes in the cloud is computed by the sync protocol. Any sync protocol can be used for the sync process. For each file that needs to be uploaded the following sequence is employed. The process begins by receiving a request from the client device to upload a file or files for synchronization to file store 240. This is illustrated at step 302. In response to the request for the synchronization the sync role stops further reads and writes of files through the sync role. This is illustrated at step 304. While the access through the sync role 210 has been blocked other client devices can still access the data in the files in the file store through the direct access means such as through the URI. As such files can change during the synchronization process.

File data is uploaded directly to a staging folder in a container associated with the namespace 241 in the cloud file system. This is illustrated at step 310. This staging folder is outside of the synchronization scope. That is the particular staging folder is a folder in the container that is not synchronized to the endpoint as part of the synchronization process. It allows the synchronization files to be uploaded into the file store prior to the committing the synchronized file changes to the corresponding file in the file store namespace..

A full set of file metadata for the file are sent to the sync role 210 as part of the sync protocol. This is illustrated at step 320. In some approaches steps 310 and 320 are reversed. In this reversed approach the full set of file metadata is sent to the sync role prior to the files themselves being uploaded.

The sync service applies all of the file metadata to the staged file. This is illustrated at step 330. Due to the nature of the metadata some of the metadata is applied to the file using the SMB APIs and some are applied using the REST APIs. For example the locally native file system properties are applied using the SMP API. The REST API is used for applying remote file system properties such as remote file system properties (such as directory services or access control lists), sync framework metadata and application metadata.

Next the file in the live namespace 241 is replaced by the staged file. This allows for the synchronization of the data to occur while still allowing for the direct access to the data and not locking the files from the direct access. The replacement begins by acquiring an exclusive file handle for the file in the live namespace. This is illustrated at step 340. This exclusive handle acts as a sort of lock on the file preventing further changes to the file until such time as the files are switched between the staged file and the live file. Following the acquisition of the exclusive handle a concurrency check may be performed between the metadata for the file in the metadata database and the file in the file store. This is illustrated at optional step 342. If the two do not match it may be because of a write activity through the direct access capability. This will cause the particular file to be skipped. If write activity is detected on the file through the direct access capability the handle will be dropped. Further, if write activity occurred prior to obtaining the exclusive handle the handle will not be acquired. The handle may have an opportunistic lock (oplock) placed on it. This lock will break if activity is detected on the corresponding file, such as a write or read. If the lock is broken the handle will be dropped. The effect of not getting or having the handle dropped will result in an error. Specifically an error will occur on a per-file basis for the particular session. This will result in that particular file being skipped in the current sync session. Next an exclusive file handle is acquired to the staged file. This acts to lock the staged file as well. This is illustrated at step 345.

Once the exclusive file handle is placed on both the live file and the staged file, file replacement is performed. This is illustrated at step 350. The replacement only occurs if both files (staged and original) still have their exclusive handles. In one approach this file replacement is done by rename and delete operations on the handles. This is done in one approach by renaming the live file to a temporary file and renaming the staged file to the name of the live file prior to the rename. Once completed the temporary file is deleted. If something were to happen during the renaming process after the live file is renamed to a temporary file, the file would be temporarily lost from the system. The file would be recovered during a subsequent synchronization from a device. In another approach the file store can expose a transactional file replacement mechanism that can be leveraged directly to update the particular file later on. After these steps the process concludes.

FIG. 4 is a flow diagram illustrating a process for downloading files to be synchronized with an endpoint from the file store 240. The process begins by the client requesting a synchronization with the sync role. This is illustrated at step 402. The present system allows for synchronizing the download of file and folder changes with potential for file system write activity to files in the file store 240 during the synchronization process.

In response to the request for a download synchronization session the sync role identifies the files in the file store that have changed or need to be synced with the client device. This is illustrated at step 405. Once the necessary files have been identified by the sync role they are packaged together in one or more download batches of files to be downloaded to the client device. This is illustrated at step 410. The size and number of the download batches may be determined by the sync role based on the characteristics of the files that need to be downloaded to the client and the specific performance of the connection between the file store and the client device.

The download batch contains a full set of metadata for each file in the download batch. The obtaining of the full set of metadata is illustrated at step 420. For each file in the download batch the file in the live namespace 241 is queried for a set of concurrency tracking properties. These tracking properties help the system and the client device know if any changes have happened to the file after the file has been added to the batch for downloading. These tracking properties as well as any other metadata for the file are sent to the client device with the download batch. This is illustrated at step 430. In some approaches during the collection of the metadata for the files in the download batch an exclusive file handle is acquired for the file in the live namespace. Failure to acquire the exclusive file handle will cause the file to be skipped for this session and retried in a later session. The failure to obtain the exclusive file handle could be the result of a read action or write action on the file that occurred from a second device during the time the handles were being acquired for the files in the download batch. Once the handle has been acquired for the file an opportunistic lock (oplock) or other lock type is set on the handle to signal and close the handle if any write activity is detected on the file. Thus, if during the formation of the download batch a change to the file is detected the file can be removed from the download batch before the client receives the file.

The client device receives the download batch including the full set of metadata for the files in the batch and begins the download process for each file in the batch. For each file in the batch the client device's sync role checks the concurrency properties for the file that were sent to it in the download batch with the concurrency properties for the file in the live namespace of the file store. This is illustrated at step 440. The client device 250 receives per-file metadata as part of the sync protocol which includes the REST timestamp property. Timestamp is one of the concurrency tracking properties maintained by the file store. The timestamp value from the per-file metadata is checked against the current value of timestamp for the file during the data download phase. If the timestamp values mismatch, the file is skipped for download and retried later. However, other concurrency tracking properties can be compared as well, so long as that property gives a reliable indication that the file has been modified.

If the properties do not match for the file and the file in the live namespace, the downloading of that file is skipped and the next file in the download batch is selected. This is illustrated at step 450. If the concurrency properties match the file is downloaded to the client device from the file store. This is illustrated at step 460. After these steps the process concludes.

One feature of the sync role 210 is that is configured to rebuild the sync metadata store 220 from the namespace 241 and per-file metadata stored in file store 240. The capability to rebuild the sync metadata store in the cloud enhances the synchronization provided by the sync role.

First, the sync role 210 allows for an efficient recovery in the event of a disaster or other evet. This cloud side rebuild reduces the amount of data and metadata that needs to be resynchronized from one or multiple partnership endpoints. Even if the cloud persisted store is not globally up-to-date, this seeding of the database will reduce the required data transfer to the extent that the cloud-persisted store matches the endpoints.

Secondly the sync role 210 allows for an independent recovery. That is in the case of cloud side sync metadata loss or corruption, the database is rebuilt and can then rejoin the sync partnership community with minimal or no more rebuild specific traffic. This is dependent on the level of fidelity achieved between the live sync database and the persistent file store.

The sync role 210 can rebuild the sync metadata store 220 in one of two ways, an authoritative rebuild or a reconciliatory rebuild. The authoritative approach rebuilds the sync database from the cloud side view of the files and metadata. It then forces all other sync partners in the mesh to throw away their view of the sync database and files, and resync from scratch. The reconciliatory approach attempts to reconcile the sync database from another node or endpoint with what it already has in the sync database. In the reconciliatory approach all mismatches between the two sync databases are considered as conflicts. In this way the other sync partners do not need to restart from scratch, but will have to address the conflicts that have been noted.

The conflict updater handles these conflicts by keeping both versions of the conflicting file side-by-side by choosing one file as the main file and renaming the other file as a "loser" file. The selection of the chosen file and the loser file can be done using any number of conflict resolution methods that are available. Other strategies exist for algorithmically choosing a loser file to eliminate from the names pace.

Figure 5:
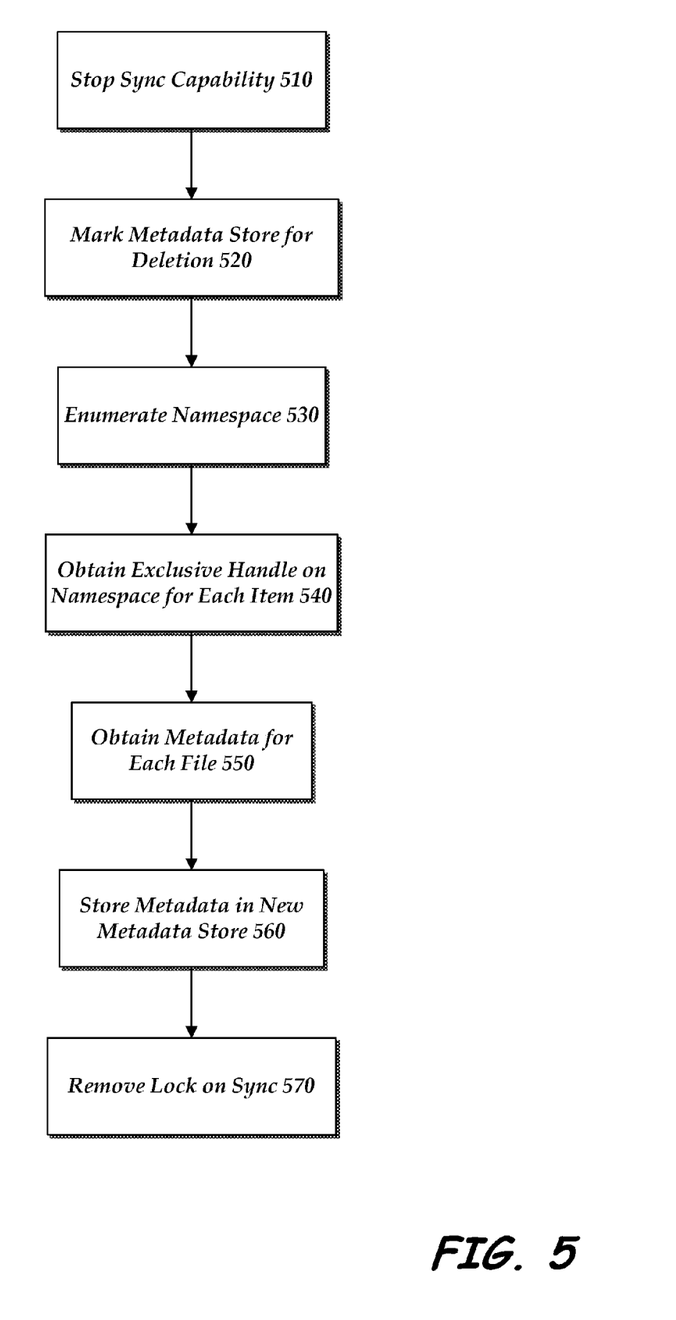
FIG. 5 is a flow diagram illustrating a process for recovering sync metadata on a hosted system according to one illustrative embodiment.

FIG. 5 is a flow diagram illustrating the steps implemented in rebuilding a sync metadata store 220 following a disaster or other event that requires the sync metadata store to be rebuilt. At step 510 sync upload and download sessions through the sync role 210 for the namespace 241 are locked out. The ability to sync with the namespace in the file store 240 remains locked out until such time as the sync metadata store 240 is rebuilt. However, endpoints that access the underlying data directly and not through the sync role 210 can continue to access the data in the file store 240 directly during the rebuilding process.

Next the currently existing sync metadata store 220 is marked for deletion. This is illustrated at step 520. The deletion may occur immediately upon this designation or maybe delayed for a period of time, such as following the full rebuild of the new sync metadata store 220. Following step 520 the namespace 241 is enumerated. This is illustrated at step 530. The enumeration of the namespace 241 is done recursively for all files and folder items. In some approaches the enumeration may use some of the efficiencies discussed above with respect to namespace enumeration.

Next an exclusive handle is opened for each item in the sync namespace. This is illustrated at step 540. Each item has an opportunistic lock applied to it. Other forms of locking can be used as well. If there is a read or write access command made to the file through the direct access the handle will be dropped. The effect of the handle being dropped for a particular item is that the item will be skipped. That is the item will not appear in the rebuilt sync metadata store 220. The skipped item or items will be added to the sync metadata store based on a subsequent change detection process. Alternatively, the item can be added when a synchronization occurs from another partnership endpoint.

For each item that is not skipped due to an access from the direct access side, metadata for each item on a per item bases is retrieved. This is illustrated at step 550. The metadata can be retrieved using a combination of the native interface and the REST interface. However, other approaches for obtaining this metadata can be used as well. This metadata includes native, remote file-system native, sync and application metadata.

The per-item metadata is set in the sync metadata store 220. This is illustrated at step 560. Once the sync metadata store is built and the namespace enumeration is completed the sync upload/download lockout through the sync role 210 is removed. This is illustrated at step 570. At this point all operations of the system return to normal and normal synchronization processes can resume.

Figure 6:
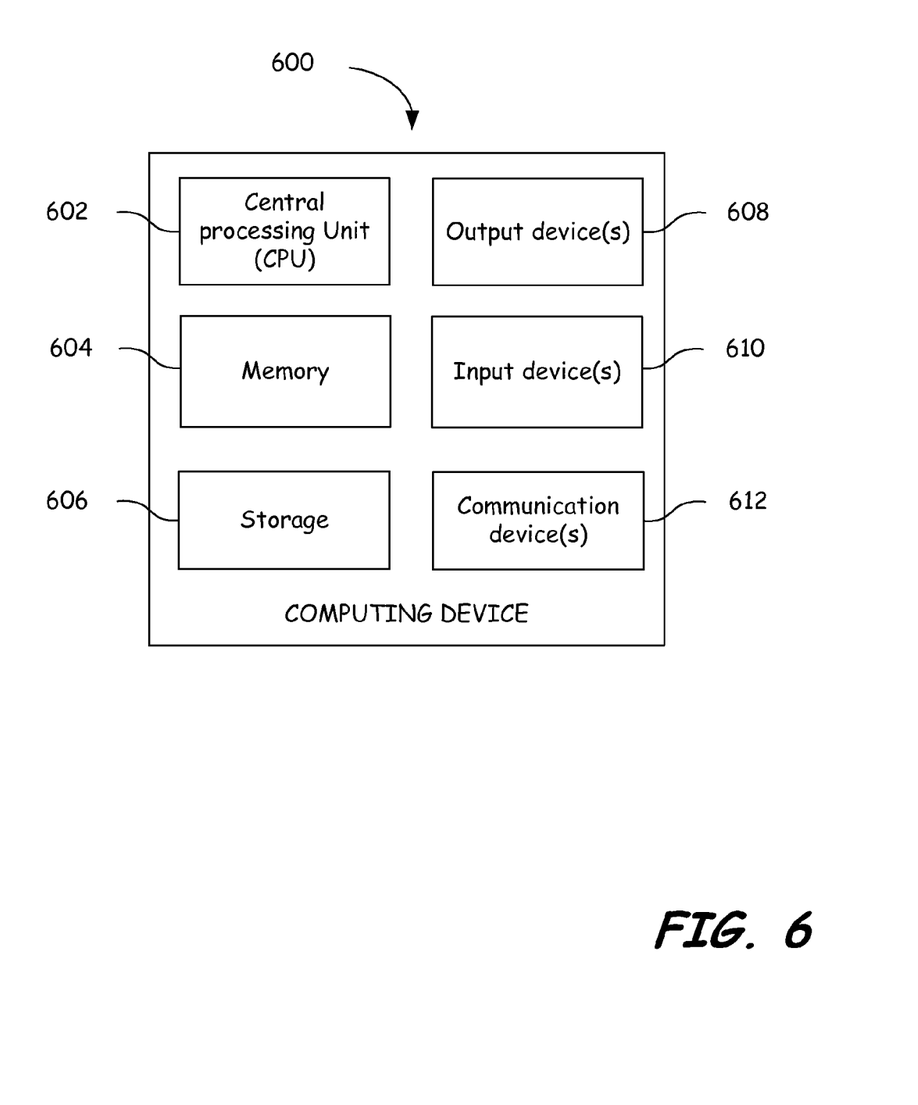
FIG. 6 illustrates a component diagram of a computing device according to one embodiment.

FIG. 6 illustrates a component diagram of a computing device according to one embodiment. The computing device 600 can be utilized to implement one or more computing devices, computer processes, or software modules described herein. In one example, the computing device 600 can be utilized to process calculations, execute instructions, receive and transmit digital signals. In another example, the computing device 600 can be utilized to process calculations, execute instructions, receive and transmit digital signals, receive and transmit search queries, and hypertext, compile computer code, as required by the system of the present embodiments. Further, computing device 600 can be a distributed computing device where components of computing device 600 are located on different computing devices that are connected to each other through network or other forms of connections. Additionally, computing device 600 can be a cloud based computing device.

The computing device 600 can be any general or special purpose computer now known or to become known capable of performing the steps and/or performing the functions described herein, either in software, hardware, firmware, or a combination thereof.

In its most basic configuration, computing device 600 typically includes at least one central processing unit (CPU) 602 and memory 604. Depending on the exact configuration and type of computing device, memory 604 may be volatile (such as RAM), non-volatile (such as ROM, flash memory, etc.) or some combination of the two. Additionally, computing device 600 may also have additional features/functionality. For example, computing device 600 may include multiple CPU's. The described methods may be executed in any manner by any processing unit in computing device 600. For example, the described process may be executed by both multiple CPU's in parallel.

Computing device 600 may also include additional storage (removable and/or non-removable) including, but not limited to, magnetic or optical disks or tape. Such additional storage is illustrated in FIG. 6 by storage 606. Computer storage media includes volatile and nonvolatile, removable and non-removable media implemented in any method or technology for storage of information such as computer readable instructions, data structures, program modules or other data. Memory 604 and storage 606 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 600. Any such computer storage media may be part of computing device 600.

Computing device 600 may also contain communications device(s) 612 that allow the device to communicate with other devices. Communications device(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 600 may also have input device(s) 610 such as keyboard, mouse, pen, voice input device, touch input device, etc. Output device(s) 608 such as a display, speakers, printer, etc. may also be included. All these devices are well known in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A cloud service for synchronizing files between a client device of a plurality of client devices and a file store through a sync role of the cloud service, the cloud service comprising:
   at least one client device;
   memory that is coupled to the at least one computing device and that includes computer-readable instructions that, based on execution by at least one computing device, configure the cloud service to perform actions comprising:
      receiving, by the cloud service from the client device, a request to synchronize a set of files with a namespace in the file store, where the each of the plurality of client devices has direct access to the file store where the direct access is not through the sync role;
      locking, by the cloud service in response to the received request, access through the sync role by the plurality of client devices to the namespace, where the locked namespace blocks read and write access through the sync role but where the locked namespace can still be directly accessed by any of the plurality of client devices;
      uploading, by the cloud service from the client device, the set of files to a staging folder;
      receiving, by the cloud service via the sync role from the client device in connection with the uploading a set of file metadata for each file in the staged set of files;
      applying, by the cloud service, each received set of file metadata to its corresponding file of in the staged set of files;
      first obtaining, by the cloud service subsequent to the applying, an exclusive handle for each of at least a portion of the files in the namespace that corresponds to a file in the staged set of files, where each obtained handle effectively blocks changes to the corresponding file in the namespace by direct access from any of the plurality of client devices;
      second obtaining, by the cloud service subsequent to the applying, an exclusive handle for each of at least a portion of the files in the staged set of files; and
      replacing, by the cloud server subsequent to the first and second obtainings, each file in the namespace for which an exclusive handle was obtained with the corresponding file in the staged set of files for which an exclusive handle was obtained.

2. The cloud service of claim 1, the actions further comprising:
   determining, by the cloud service subsequent to the applying and prior to the replacing, that metadata of a file in the staged set of files and metadata of the corresponding file in the namespace do not match; and
   dropping, by the cloud service in response to the determining, any obtained exclusive handle to the file in the staged set of files or any obtained exclusive handle to the corresponding file in the namespace.

3. The cloud service of claim 1 where the file store comprises the namespace.

4. The cloud service of claim 1 where the cloud service is configured for synchronizing files and folders from NTFS, FAT, and SMB file systems.

5. The cloud service of claim 1 where the namespace, when unlocked, can be accessed through the sync role by any of the plurality of client devices, where such access comprises reading and writing files and folder within the namespace.

6. The cloud service of claim 1 where the replacing comprises:
   first renaming a file in the namespace for which an exclusive handle was obtained from its original name to a temporary name; and
   second renaming the corresponding file in the staged set of files for which an exclusive handle was obtained to the original name.

7. The cloud service of claim 6 where the renaming further comprises deleting the first renamed file with the temporary name.

8. A method performed on at least one computing device of a cloud service, the method for synchronizing files between a client device of a plurality of client devices and a file store through a sync role of the cloud service, the method comprising:
   receiving, by the cloud service from the client device, a request to synchronize a set of files with a namespace in the file store, where the each of the plurality of client devices has direct access to the file store where the direct access is not through the sync role;

locking, by the cloud service in response to the received request, access through the sync role by the plurality of client devices to the namespace, where the locked namespace blocks read and write access through the sync role but where the locked namespace can still be directly accessed by any of the plurality of client devices;

uploading, by the cloud service from the client device, the set of files to a staging folder;

receiving, by the cloud service via the sync role from the client device in connection with the uploading a set of file metadata for each file in the staged set of files;

applying, by the cloud service, each received set of file metadata to its corresponding file of in the staged set of files;

first obtaining, by the cloud service subsequent to the applying, an exclusive handle for each of at least a portion of the files in the namespace that corresponds to a file in the staged set of files, where each obtained handle effectively blocks changes to the corresponding file in the namespace by direct access from any of the plurality of client devices;

second obtaining, by the cloud service subsequent to the applying, an exclusive handle for each of at least a portion of the files in the staged set of files; and replacing, by the cloud server subsequent to the first and second obtainings, each file in the namespace for which an exclusive handle was obtained with the corresponding file in the staged set of files for which an exclusive handle was obtained.

9. The method of claim 8 further comprising:
determining, by the cloud service subsequent to the applying and prior to the replacing, that metadata of a file in the staged set of files and metadata of the corresponding file in the namespace do not match; and dropping, by the cloud service in response to the determining, any obtained exclusive handle to the file in the staged set of files or any obtained exclusive handle to the corresponding file in the namespace.

10. The method of claim 8 where the file store comprises the namespace.

11. The method of claim 8 where the cloud service is configured for synchronizing files and folders from NTFS, FAT, and SMB file systems.

12. The method of claim 8 where the namespace, when unlocked, can be accessed through the sync role by any of the plurality of client devices, where such access comprises reading and writing files and folder within the namespace.

13. The method of claim 8 where the replacing comprises:
first renaming a file in the namespace for which an exclusive handle was obtained from its original name to a temporary name; and second renaming the corresponding file in the staged set of files for which an exclusive handle was obtained to the original name.

14. The method of claim 13 where the renaming further comprises deleting the first renamed file with the temporary name.

15. At least one hardware computer storage medium that includes computer-readable instructions that, based on execution by at least one computing device of a cloud service, configure the cloud service to perform actions for synchronizing files between a client device of a plurality of client devices and a file store through a sync role of the cloud service, the actions comprising:

receiving, by the cloud service from the client device, a request to synchronize a set of files with a namespace in the file store, where the each of the plurality of client devices has direct access to the file store where the direct access is not through the sync role;

locking, by the cloud service in response to the received request, access through the sync role by the plurality of client devices to the namespace, where the locked namespace blocks read and write access through the sync role but where the locked namespace can still be directly accessed by any of the plurality of client devices;

uploading, by the cloud service from the client device, the set of files to a staging folder;

receiving, by the cloud service via the sync role from the client device in connection with the uploading a set of file metadata for each file in the staged set of files;

applying, by the cloud service, each received set of file metadata to its corresponding file of in the staged set of files;

first obtaining, by the cloud service subsequent to the applying, an exclusive handle for each of at least a portion of the files in the namespace that corresponds to a file in the staged set of files, where each obtained handle effectively blocks changes to the corresponding file in the namespace by direct access from any of the plurality of client devices;

second obtaining, by the cloud service subsequent to the applying, an exclusive handle for each of at least a portion of the files in the staged set of files; and replacing, by the cloud server subsequent to the first and second obtainings, each file in the namespace for which an exclusive handle was obtained with the corresponding file in the staged set of files for which an exclusive handle was obtained.

16. The at least one hardware computer-storage medium of claim 15, the actions further comprising:
determining, by the cloud service subsequent to the applying and prior to the replacing, that metadata of a file in the staged set of files and metadata of the corresponding file in the namespace do not match; and dropping, by the cloud service in response to the determining, any obtained exclusive handle to the file in the staged set of files or any obtained exclusive handle to the corresponding file in the namespace.

17. The at least one hardware computer-storage medium of claim 15 where the file store comprises the namespace.

18. The at least one hardware computer-storage medium of claim 15 where the cloud service is configured for synchronizing files and folders from NTFS, FAT, and SMB file systems.

19. The at least one hardware computer-storage medium of claim 15 where the namespace, when unlocked, can be accessed through the sync role by any of the plurality of client devices, where such access comprises reading and writing files and folder within the namespace.

20. The at least one hardware computer-storage medium of claim 15 where the replacing comprises:
first renaming a file in the namespace for which an exclusive handle was obtained from its original name to a temporary name;

second renaming the corresponding file in the staged set of files for which an exclusive handle was obtained to the original name; and deleting the first renamed file with the temporary name.

* * * * *